United States Patent [19]
Kyri et al.

[11] 4,040,850
[45] Aug. 9, 1977

[54] PRODUCTION OF POROUS GYPSUM MOLDINGS

[75] Inventors: Hans Kyri, Cologne; Karl Brändle, Leverkusen; Martin Müller; Heinrich Heine, both of Krefeld, all of Germany

[73] Assignee: Bayer Aktiengesellschaft, Leverkusen, Germany

[21] Appl. No.: 604,856

[22] Filed: Aug. 14, 1975

[30] Foreign Application Priority Data

Sept. 3, 1974  Germany ............... 2442021

[51] Int. Cl.$^2$ ............................................. C04B 11/00
[52] U.S. Cl. ........................................ 106/87; 106/109; 106/110; 106/122
[58] Field of Search ................ 106/109, 110, 122, 87

[56] References Cited

U.S. PATENT DOCUMENTS

| | | | |
|---|---|---|---|
| 2,662,825 | 12/1953 | Kauffmann | 106/87 |
| 3,688,437 | 9/1972 | Hamrin | 106/122 |

FOREIGN PATENT DOCUMENTS

| | | |
|---|---|---|
| 176,493 | 10/1953 | Austria |
| 928,039 | 5/1955 | Germany |

*Primary Examiner*—Patrick P. Garvin
*Assistant Examiner*—John P. Sheehan
*Attorney, Agent, or Firm*—Burgess, Dinklage & Sprung

[57] ABSTRACT

In the production of a gypsum-based porous body of high strength by foaming a gypsum-water mixture, the improvement which comprises including in said mixture about 0.1 to 1 part of a water-soluble aluminum compound per 100 parts by weight of gypsum, calcium oxide or calcium hydroxide in such a quantity that the final mixture has a pH-value in the range of about 10 to 13, a decomposition catalyst, and about 0.5 to 5 parts of hydrogen peroxide, expressed as a 35% solution, per 100 parts by weight of mixture, the ratio of solids to liquid being about 1 : 0.4 – 1.

The preferred aluminum compound is aluminum nitrate. The preferred decomposition catalysts are manganese compounds such as manganates or permanganates, e.g. potassium permanganate.

10 Claims, No Drawings

PRODUCTION OF POROUS GYPSUM MOLDINGS

This invention relates to a process for the production of porous bodies based on gypsum, more especially anhydrite, by liberating oxygen from hydrogen peroxide in an alkaline binder suspension. The suspension quickly foams to completion, is cast and sets with the pore structure intact.

The foaming of aqueous suspensions of calcium sulfate semihydrate, which is known as plaster of Paris, or of anhydrous calcium sulfate, known as anhydrite, is known in principle. Thus, it is possible, by mixing a gypsum "pulp" and an aqueous foam, prepared separately therefrom, to obtain a mass permeated by air bubbles which sets with the pore structure substantially intact. Disadvantages of this process include the partial collapse of the pore structure when the two components are mixed, and the fact that the process can only be carried out in batches because the foamed mass can only be handled with further collapse of the pore structure.

In other known processes, a gas is produced in the pulp by a chemical reaction, the required pore structure subsequently being formed by this gas. It is preferred to produce carbon dioxide as the blowing gas by reacting carbonates with acids or with acid-reacting salts such as, for example, aluminum sulfate. Naturally, these processes are carried out in an acid medium at a pH value below 7 (German DAS 1,300,459 and 1,571,575).

It is also known that hydrogen peroxide can be catalytically decomposed in an alkaline medium, oxygen being given off (U.S. Pat. No. 2,662,825; German Patent 928,039; Austrian Patent 176,493). Manganese dioxide, manganese sulfate and manganese chloride are used as catalysts. The decomposition, which takes place spontaneously, gives rise to considerable difficulties in coordinating the end of foam formation with the beginning of setting. In the case of non-stabilized foams, overrapid gas evolution readily results in the collapse of the foamed mass. If, by contrast, the evolution of gas is not complete by the time setting begins, an inhomogeneous body of low strength permeated by cracks is formed. It is difficult to achieve uniform properties in the products.

Standard commercial-grad anhydrite contains from 0.3% to 3.0% of free calcium oxide or an equivalent quantity of calcium hydroxide as an activator for the setting process. Although the so-called "acid activation" of anhydrite with aluminum sulfate is also known, it gives very poor strength levels and, for this reason, is not used in practice.

A foaming wetting agent is used to promote foam formation, preferably during the separate production of an aqueous foam (Austrian Patent 176,493). According to German DOS 2,056,255, pore formation is obtained by stirring air into a gypsum pulp containing an addition of, for example, an alpha-olefin sulfate. However, even in cases where this wetting agent is used, the effect obtained is only minimal because the density of the porous sypsum thus produced is only slightly different from the value obtained taking into account the evaporated excess of water. The use of a wetting agent in the gypsum pulp is obviously not sufficient for the production of a stable foam.

According to German DOS 1,947,365, a particulate lamellar additive, for example talcum or aluminum in flake form, is used as a foam stabilizer. Reference is also made in this document to the difficulties involved in preparing gypsum pulps in continuous mixers of conventional type, these difficulties being caused by small quantities of freshly set gypsum in apparatus of this kind. This gypsum acts as a setting accelerator and, hence, causes such premature hardening that difficulties are frequently involved in casting the foamed mass. In order to avoid these difficulties, the reference proposes a special mixing apparatus with extremely short residence times of the pulp in the mixing zone.

One important characteristic of the foamed liquid gypsum suspension is the stability of the foam structure once it has formed. Equally important, however, is the rate at which the forms structure forms during foaming. The gas-forming reaction must always be complete by the time the mass begins to set. Any further evolution of gas would only destroy the already formed, solid structure as a result of a change in volume. This would result in inadequate strength of the foam body or even in its partial destruction through crack formation. In cases where a foam of this kind is continuously produced, it would be a considerable advantage if the evolution of gas were complete by the time the liquid foam is cast in the formwork. In this way, filling of the formwork could be visually observed.

On the other hand, it is essential that the foam, once formed, should retain its volume and its structure until it has hardened as a result of setting. Stabilizing the foamed liquid mass involves problems insofar as, in the foaming of anhydrite, the foamed liquid mass shows a strongly alkaline reaction on account of the free calcium oxide present in the anhydrite. In addition, any additives used to stabilize the foam should not have any adverse effect upon the compressive strength of the foam body. Accordingly, several organic substances with a basically satisfactory effect are ruled out as stabilizers on account of their adverse effect upon strength.

Another limitation is the fact that stabilizing additives should not increase the water demand of the suspension. The water demand, expressed in parts of water per part of solid, is known as the water factor.

Experience gained with anhydrite and gypsum shows that the strength of the set body is better, the lower the water factor is above the theoretical water demand required for setting.

The object of the present invention is to provide porous bodies based on gypsum and a process for their production, in which the requirements referred to above are satisfied and the disadvantages of conventional processes are overcome. In the context of the invention, the expression "gypsum" is used for completely and partly dehydrated calcium sulfate hydrates which have the property of setting in the presence of water. In other words, the expression "gypsum" covers, for example, the semihydrate $CaSO_4.\tfrac{1}{2}H_2O$, plaster of Paris, and also the anhydrous-forms $CaSO_4$, screened gypsum and the synthetic and natural anhydrite. Plaster of paris normally contains somewhat less water than the so-called semihydrate, although it is also known as semihydrate. In the context of the invention, the expression "semihydrate" is used as a generic term and also stands for plaster of Paris.

According to the invention, this object is achieved by adding an aqueous hydrogen peroxide solution to an aqueous alkaline suspension of gypsum which contains, in a small quantity, a water-soluble aluminum salt and, optionally, decomposition catalysts. The mixture foams immediately, is cast in its foamed form and, on completion of foam formation, sets with its pore structure intact.

Accordingly, the present invention relates to a process for the production of porous bodies based on gypsum with high strength and a uniform pore structure by foaming a gypsum-water mixture, to which diluents, fillers, dyes, wetting agents and/or additives for influencing setting and flow behavior may optionally be added, by the catalytic decomposition of hydrogen peroxide or its compounds, distinguished by the fact that a mixture is prepared which, per 100 parts of gypsum, contains approximately 0.1 to 1 part of water-soluble aluminum compound, calcium oxide or calcium hydroxide in such a quantity that the final mixture has a pH-value of about 10 to 13, decomposition catalysts, water and, per 100 parts of mixture, about 0.5 to 5 parts of hydrogen peroxide, expressed as a 35% solution, the ratio of solids to liquid amounting to between about 1 : 0.4 – 1, and the mixture thus prepared is brought into any form.

The addition of a water-soluble aluminum salt to the mixtures to be foamed effectively stabilizes the foam structure of the foamed mass. The pores are formed very uniformly and foaming may readily be reproduced, so that it is possible to produce foamed bodies with the particular properties required. In addition, the oxygen yield, based on the hydrogen peroxide used, is improved, amounting to between about 50 to 95%.

Instead of using hydrogen peroxide, it is also possible to use its derivatives, for example peroxides or $H_2O_2$-addition compounds.

The mixture should show an alkaline reaction in aqueous suspension. Synthetic anhydrite normally contains about 0.3 to 3% of calcium oxide or an equivalent quantity of calcium hydroxide. In all other cases, basic constituents are added. The calcium sulfate material should contain at least about 0.1% of CaO or an equivalent quantity of corresponding bases, for example $Ca(OH)_2$. This proportion is highly variable, the only requirement being that the mixture to be foamed should have a pH-value of about 10 to 13 in aqueous suspension.

The water-soluble aluminum salts are added in such a quantity that the mixture contains at least about a 50% molar excess of CaO and/or $Ca(OH)_2$. With a larger proportion of aluminum ions, the stabilizing effect upon the foam is adversely affected. In general, it is sufficient to add much smaller quantities of aluminum salts. The proportion preferably amounts to between about 0.5 and 0.2 equivalents, based on calcium oxide. Based on gypsum, the proportion of $AL(NO_3)_3.9 H_2O$ amounts, for example, to between about 0.1 and 1% by weight and preferably to between about 0.2 and 0.5% by weight. The various aluminum salts are used in corresponding equivalent quantities.

The aluminum salts used in accordance with the invention should be adequately soluble in water. Suitable aluminum salts are, for example, aluminum chloride and aluminates, aluminum sulfate, aluminum nitrate, double salts (alums) and basic salts, for example basic aluminum nitrate, being particularly suitable.

The addition of aluminum sulfate to an anhydrite activated with CaO or $Ca(OH)_2$ is known per se (German DAS 1,228,544). However, in this known process, which is concerned with the production of compact bodies, only a small stoichiometric excess of calcium hydroxide, based on aluminum sulfate, is added and it is only used for completely precipitating the aluminum in hydroxide form. The $Al(OH)_3$ precipitated is said to improve the setting behavior by storing water and to give considerably stronger anhydrite bodies than those obtained where calcium sulfate, for example, is used as an activator.

Suitable catalysts are, above all, manganese compounds, for example manganese sulfate and manganese chloride. Manganese compounds soluble in the alkaline medium, for example manganates and permanganates, are particularly effective. The catalysts may be added to the gypsum in solid form, although they are preferably added to a gypsum suspension in the form of an aqueous solution. The catalysts are thoroughly mixed with the material in order to guarantee uniform evolution of oxygen. The quantities used are governed by the effectiveness of the particular catalyst used. For example, about 0.1 to 0.5 part of $KMnO_4$ are added to about 100 parts of gypsum. 0.3 part of $KMnO_4$, approximately 1 part of $MnSO_4$ or $MnCl_2$ or 3 parts of manganese dioxide are equally effective.

It is also possible to use conventional activators, for example calcium sulfate for synthetic anhydrite, or silica sol for plaster of Paris, which additionally influence the setting behavior of the anhydrite-gypsum mixture in the particular manner required.

In addition, the flow properties may be influenced by the addition of so-called plasticizers, for example modified melamine resins, cellulose ethers, etc.

Surface-active substances which promote foam formation are preferably added to the mixture.

The proportion amounts to between about 0.01 and 0.1 part of wetting agent, based on 100 parts of the dry mixture. Wetting agents based on alkyl sulfonates are particularly suitable.

The gypsum is used in the form of partly or completely dehydrated calcium sulfates which set in the presence of water, i.e. for example semihydrate or plaster of Paris or synthetic or natural anhydrite. Synthetic anhydrite is formed for example in large quantities in the production of hydrofluoric acid from fluorspar and sulfuric acid where it accumulates in the form of so-called cinders. It is also possible to use mixtures of semihydrate and anhydrite in any ratio. It is preferred to use mixtures containing up to about 50% of semihydrate, anhydrite-semihydrate mixtures containing about 10 to 40% of semihydrate (plaster of Paris) for adjusting their setting behavior being particularly suitable. However, it is also possible to use gypsum in admixture with other inorganic binders.

In addition, it is also possible to add known additives (fillers and diluents) such as sand, calcium sulfate dihydrate, expanded clay, pumice, cork, plastic granulate, glass fibers, glass wool, mineral wool, organic fibers, foamed glass particles and also pigments.

The only requirement is that these additives should be system-compatible, i.e. substantially alkali-resistant.

In the process according to the invention, the components gypsum, water-soluble aluminum salt and a catalyst (manganese salt) are stirred into water in the ratio mentioned above. An aqueous hydrogen peroxide solution is then introduced with stirring into the alkaline suspension. However, it is also possible thoroughly to mix the solids in dry form and subsequently to suspend the resulting mixture with an aqueous hydrogen peroxide solution. The quantity of water used should merely be such that the total ratio of solids to liquid is between 1 : 0.4 and 1 : 1. When the $H_2O_2$ solution is added, oxygen is immediately given off uniformly. Foam formation takes place quickly. In general, the foamed mass has reached as much as 90% of its original volume after 1 minute at the most. Foaming may be accelerated to such an extent that it is complete after only a few seconds. The foam structure is stabilized by the addition of aluminum salts in accordance with the invention to such an extent that it is not destroyed during further processing. It remains almost completely intact in the porous end products. The uniformly foamed liquid mass may readily be cast into molds of any kind or onto substrates surrounded by formwork and may be transported through pipes. Casting the foamed mass without any further change in structure has the significant advantage that the shape of the end product may be selected as required and established at the casting stage. The foamed mass begins to harden after only a few minutes, in other words it loses its free flow properties. This time may be adjusted to 30 minutes, especially through the semihydrate : anhydrite ratio, and through a combination with the aluminum salts to be used in accordance with the invention.

The choice of the suitable aluminum salt for stabilizing the foam is governed by the required hardening time. The use of aluminum sulfate or an alum gives a foamed mass which can no longer be cast after only a few minutes, especially in cases where mixtures of anhydrite and plaster of paris are processed. This procedure may be advantageous in cases where small batches containing about 50 kg of the starting-material mixture are foamed and cast in batches. In cases where a continuous procedure is adopted, the foamed material is in danger of solidfying in the pipes or even in the mixing apparatus itself on account of the short hardening time, thereby interrupting the process. It has been found that the beginning of hardening can be delayed as much as 30 minutes by using sulfate-free aluminum salts. This reliably precludes the danger of blockages in the apparatus or pipes used. Aluminum nitrate is particularly advantageous both in regard to its effect as a stabilizer and also for modifying castability.

On the other hand, it is standard practice, even in he processing of anhydrite, to use calcium sulfate as effective activator and, by adding it, to shorten the hardening time. The quantity of sulfate-containing activator which produces the optimum stiffening time for the particular application envisaged may be determined by a relatively simple preliminary test.

The foamed mass may be transported, for example, through pipes and may be prepared in mixers of conventional type. After 20 hours at the longest, it has hardened to such an extent that it is self-supporting and may be removed from the mold. The porous bodies obtained after complete setting and drying (approximately 5 days) show outstanding strength properties. Their compressive strengths amount to between about 4 and 50 kp/cm$^2$ depending upon the particular unit weight. The unit weight may be varied within wide limits through the quantity of hydrogen peroxide used and generally amounts to between approximately 200 and 800 kg/m$^3$. The pores are uniformly distributed and have a uniform size of about 0.1 to 4 mm, preferably about 0.2 to 2 mm.

In one preferred embodiment, an aqueous suspension of gypsum is continuously foamed. The machines normally used in the building industry for suspending gypsum may be used for this purpose. A machine of this kind consists essentially of a storage tank for the powdered solids, a small mixing compartment, in which solids and water are combined, and a sludge pump which is used for conveying the suspension. The solids are introduced into the mixing compartment from the storage tank through a screw. The mixing compartment contains a simple stirrer. The stirrer and the sludge pump are normally mounted on the same shaft through which they are driven. The mixing water is introduced through a through-flow regulator.

A dry mixture of gypsum, containing an aluminum salt, a manganese salt and free calcium or calcium hydroxide, is suspended with water in the mixing compartment. An aqueous hydrogen peroxide solution, optionally containing a wetting agent, is introduced into the alkaline suspension. This solution is also known as the foamer solution. The foamed mass is discharged by means of a sludge pump and cast. In one particularly preferred embodiment, the foamer solution is only added after the aqueous suspension has left the mixing compartment, advantageously immediately behind the sludge pump. The suspension is foamed during delivery through a hose, after which the foamed mass may be directly cast. The input ratio of solids to water to foamer solution may be varied as required, the only requirement being that the ratio of solids to liquid should be in the range from 1 : 0.4 to 1 : 1.

The porous bodies produced in accordance with the invention may be used, for example, in the form of blocks, bricks or panels as lightweight structural materials and as insulating materials, especially in cases where fireproof materials are required. They are completely non-inflammable, unaffected by periodic freezing and do not give off any gases when heated. They do not require high material and manufacturing costs and show excellent strengths and limited brittleness. Since the foamed mass is cast in liquid form and sets cold, the process may be carried out in situ. For example, it is possible to fill gaps and cavities. The mass is preferably cast in the form of a heat-insulating and sound-insulating layer.

Casting of the foam without any subsequent changes in volume represents a significant commercial advantage, especially in cases where it is intended to fill formwork with the foam. Another advantage is that this mass does not undergo any changes in structure through continued "growth" of the foam after the onset of setting.

The process according to the invention is illustrated by the following Examples:

EXAMPLE 1

A solution of 4.0 of $Al(NO_3)_3.9aH_2O$ and 0.3 g of $KMnO_4$ in 600 ml of water was initially introduced into a 3 liter vessel equipped with an intensive stirrer (400 rpm). A mixture of 700 g of anhydrite according to DIN 4208, containing 1.0% of CaO, and 300 g of gypsum according to DIN 1168, was stirred into this solution over a period of 1 minute. A solution of 75 ml of water, 20 ml of 35% $H_2O_2$ and 0.1 g of a wetting agent, preferably an alkyl sulfonate, was introduced into this suspension, followed by stirring for about 20 seconds. The ratio of solids to liquid thus amounted to 1.0 : 0.6. The mass foamed immediately after the $H_2O_2$ solution had been added and reached its final volume after about 25 seconds. This volume remained substantially intact both on standing and when the mass was cast. The foamed mass was cast into a prepared mold and, after about 10 minutes, had hardened to such an extent that it no longer flowed freely. The foamed body could be removed from the mold after 24 hours at the longest. It had a volume of 3000 ml ± 5% and a uniform structure.

Pore diameter: 1 - 2 mm. After complete setting and drying, the foamed body had a unit weight of 400 kg/m³ and a compressive strength of 6 kp/cm². The oxygen yield amounted to 65%, based on the H₂O₂ used.

Conparison Example

The procedure was as described in Example 1, except that no aluminum nitrate was used. The alkaline suspension foamed in the same way on addition of the H₂O₂ solution could also be cast in the same way. The foamed mass underwent a change in structure after about 6 to 8 minutes. The pores were irregular and had increased in size. The foamed mass partly collapsed and underwent a reduction in volume. The porous bodies obtained in this way were virtually useless.

EXAMPLE 2

A dry mixture was prepared from 70 parts of anhydrite containing 1.0% of CaO, 30 parts of gypsum, 0.4 part of aluminum nitrate and 0.03 part of potassium permanganate. At the same time, a so-called foamer solution was prepared from 2.0 parts of 35% hydrogen peroxide, 0.15 part of an effectively foaming wetting agent and 3.0 parts of water. The dry mixture was suspended in an apparatus of the kind commonly used in the building industry for continuously mixing gypsum. The ratio of solids to water was adjusted to 1.6 : 0.5. The suspension was discharged from the mixer into a carrier hose by means of a sludge pump. Immediately behind the sludge pump, the foamer solution was introduced into the suspension by means of a metering pump. After being conveyed through the hose over a distance corresponding to a residence time of 20 seconds after addition of the former solution, the foamed mass was cast. By this time, it had virtually reached its final volume. After hardening and drying, a porous body produced in this way was identical with the porous body produced in accordance with Example 1. The ratio of solids to foamer solution was 20 : 1, and the ratio of water to foamer solution was 10 : 1. The total ratio of solids to liquid was 1.0 : 0.65.

EXAMPLE 3

The procedure was as described in Example 2, except that the foamer solution was introduced into the water required for mixing before entry into the mixer. The ratio of solids to water to foamer solution was adjusted to 1.0 : 0.5 : 0.05. After casting, hardening and drying, a porous body was obtained which was entirely comparable with the porous bodies produced in accordance with Examples 1 and 2.

EXAMPLE 4

A solution of 0.5 kg of Al(NO₃)₃.9 H₂O, 0.3 g of KMnO₄ and 0.15 g of a wetting agent based on an alkyl sulfonate, in 900 ml of water, was initially introduced into a 3 liter vessel equipped with an intensive stirrer of the type used in Example 1. A mixture of 999 g of plaster of Paris and 1 g of CaO (or the equivalent quantity of Ca(OH)₂) was stirred into this solution over a period of 1 minute and suspended therein. A solution consisting of 20 ml of 35% hydrogen peroxide and 80 ml of water, was introduced into this suspension with stirring. The mass foamed over a period of 30 seconds. After foaming, it was introduced into a prepared mold in which it hardened by setting.

Setting was complete after about 3 hours. The foam body was then removed from the mold and dried at a temperature below 40° C.

After setting and drying, a porous body was obtained with a unit weight of approximately 300 kg/m³ and a compressive strength of 2 to 4 kg/cm².

EXAMPLE 5

100 g of glass fibers with a fiber length of approximately 5 mm were dispersed in 625 ml of water in a 3 liter vessel equipped with an intensive stirrer of the type used in Example 1. A dry solids mixture of 700 g of anhydrite containing 1% of CaO, 300 g of plaster of Paris, 4.0 g Al(NO₃)₃.9 H₂O and 0.3 g of KMnO₄, was introduced into this dispersion over a period of 1 minute, followed by stirring. The foamer solution, consisting of 0.15 g of an alkyl sulfonate, 5.0 g of K₂SO₄, 20 ml of 35% hydrogen peroxide and 50 ml of water, was then introduced with continued stirring. The mass foamed immediately and reached its final volume after about 25 seconds. It was introduced into a prepared mold in which it hardened through setting of the calcium sulfate components. After drying, the foam body had a unit weight of 350 kg/m³ and a compressive strength of about 6 kg/cm².

EXAMPLE 6

A solution of 4.0 g of Al(NO₃)₃.9 H₂O, 0.3 g of KMnO₄ and 0.15 g of a wetting agent based on an alkyl sulfonate in 450 ml of water was initially introduced into a 3 liter vessel equipped with an intensive stirrer (400 rpm). 1000 g of anhydrite containing 1.0% of CaO were introduced into this solution over a period of 1 minute and suspended by stirring. A solution consisting of 20 ml of 35% hydrogen peroxide and 80 ml of water was stirred into this suspension. The mass foamed into a readily castable foam over a period of 25 seconds. The foamed mass was introduced into a prepared mold in which it hardened over a period of 24 hours to such an extent that it could be removed from the mold, 3200 ml of foamed mass were formed, producing a foam body with a unit weight of 280 kg/m³ after setting and drying.

It will be appreciated that the instant specification and examples are set forth by way of illustration and not limitation, and that various modifications and changes may be made without departing from the spirit and scope of the present invention.

What is claimed is:

1. In the production of a gypsum based porous body of high strength by foaming a gypsum-water mixture, the improvement which comprises including in said mixture of water and calcium sulfate about 0.1 to 1 part of a water-soluble aluminum salt per 100 parts by weight of gypsum, at least about 0.1% by weight of calcium oxide or the equivalent amount of calcium hydroxide in such a quantity that the final mixture has a pH-value in the range of about 10 to 13, a decomposition catalyst, and about 0.5 to 5 parts of hydrogen peroxide, expressed as a 35% solution, per 100 parts by weight of mixture, the ratio of solids to liquid being about 1 :0.4 - 1.

2. A process as claimed in claim 1, wherein the foamed mass is cast in fluid form into a mold after reaching 90% of its final volume.

3. A process as claimed in claim 1, wherein the proportion of water-soluble aluminum salt is about 0.05 to 0.5 equivalents of the calcium oxide present in the gypsum.

4. A process as claimed in claim 1, wherein the aluminum salt is aluminum nitrate and is employed in about 0.05 to 0.2 equivalents of the calcium oxide present in the gypsum.

5. A process as claimed in claim 1, wherein a mass consisting essentially of at least one of anhydrite and semihydrate is suspended with water and the hydrogen peroxide solution is subsequently added.

6. A process as claimed in claim 1, wherein the decomposition catalyst is added to the aqueous suspension of gypsum.

7. A process as claimed in claim 1, wherein the decomposition catalyst is a manganese salt soluble in alkaline medium.

8. A process as claimed in claim 7, wherein the decomposition catalyst is a manganate or permanganate.

9. A process as claimed in claim 8, wherein the decomposition catalyst is potassium permanganate and is used in about 0.1 to 0.5 part per 100 parts by weight of gypsum.

10. A process as claimed in claim 9, wherein a mass consisting essentially of at least one of anhydrite and semihydrate is suspended with water, the potassium permanganate and about 0.05 to 0.2 equivalents of aluminum nitrate based on the calcium oxide, the hydrogen peroxide solution is added thereby to produce foaming, and the foamed mass is cast in fluid form into a mold after reaching 90% of its final volume.

* * * * *